US008924989B2

(12) United States Patent
Ross (10) Patent No.: US 8,924,989 B2
(45) Date of Patent: *Dec. 30, 2014

(54) SYSTEM AND METHOD FOR INTEGRATED HARDWARE PLATFORM FOR FLASH APPLICATIONS WITH DISTRIBUTED OBJECTS

(71) Applicant: Disney Enterprises, Inc., Burbank, CA (US)

(72) Inventor: Jonathan Ross, Studio City, CA (US)

(73) Assignee: Disney Enterprises, Inc., Burbank, CA (US)

(*) Notice: Subject to any disclaimer, the term of this patent is extended or adjusted under 35 U.S.C. 154(b) by 70 days.

This patent is subject to a terminal disclaimer.

(21) Appl. No.: 13/732,075

(22) Filed: Dec. 31, 2012

(65) Prior Publication Data
US 2013/0132979 A1   May 23, 2013

Related U.S. Application Data

(63) Continuation of application No. 12/319,979, filed on Jan. 13, 2009, now Pat. No. 8,359,605.

(51) Int. Cl.
*G06F 13/00* (2006.01)
*G06F 9/54* (2006.01)
*H04L 29/06* (2006.01)

(52) U.S. Cl.
CPC ............... *G06F 9/541* (2013.01); *G06F 9/548* (2013.01); *H04L 67/38* (2013.01)
USPC ......................................... 719/328; 719/330

(58) Field of Classification Search
CPC .................................. G06F 9/541; G06F 9/547
USPC ................................................... 719/328, 330
See application file for complete search history.

(56) References Cited

U.S. PATENT DOCUMENTS 7,967,657 B2 * 6/2011 Ganz ............................ 446/175
8,230,455 B2 * 7/2012 Hazlewood et al. ............. 725/5
8,353,767 B1 * 1/2013 Borst et al. ...................... 463/31

(Continued)

FOREIGN PATENT DOCUMENTS

EP      1 916 600        4/2008

OTHER PUBLICATIONS

M. Jeff Wilson: "Get smart with proxies and RMI", Nov. 10, 2000, Retrieved from the Internet 15 pages.

(Continued)

*Primary Examiner* — Andy Ho
(74) *Attorney, Agent, or Firm* — Farjami & Farjami LLP (57) ABSTRACT

There are provided systems and methods for providing an integrated hardware platform to allow hardware control via an Application Program Interface (API) used by a Flash application executing in a Flash runtime environment on a host system. There is a provided a computer platform comprising a processor, a peripheral hardware, a connector device, and a memory. The memory contains an API implementation for remote methods provided by the API for the Flash application, a proxy server for enabling communications between the Flash application and the platform processor, and a security service for providing a security policy to grant network connection permissions for communications with the platform processor. API remote method invocations allow the Flash application to control the peripheral hardware, and a networked server may manage remote invocations to control platform hardware of multiple networked clients.

20 Claims, 4 Drawing Sheets (56) References Cited

U.S. PATENT DOCUMENTS

2008/0039204 A1* 2/2008 Ackley et al. ............... 463/40
2008/0076573 A1* 3/2008 Loehrer ....................... 463/42
2010/0023454 A1* 1/2010 Exton et al. ................. 705/44

OTHER PUBLICATIONS

Induruwa et al., *Building Sensor Networks with Distributed Intelligence using Java RMI*, The Second International Conference on Sensor Technologies and Applications, IEEE, Aug. 25, 2008, pp. 246-251.

* cited by examiner

SYSTEM AND METHOD FOR INTEGRATED HARDWARE PLATFORM FOR FLASH APPLICATIONS WITH DISTRIBUTED OBJECTS

This application is a continuation of U.S. patent application Ser. No. 12/319,979, filed Jan. 13, 2009, now U.S. Pat. No. 8,359,605.

BACKGROUND OF THE INVENTION

1. Field of the Invention

The present invention relates generally to data and graphic presentations. More particularly, the present invention relates to Flash applications with distributed objects.

2. Background Art

The Flash platform is popular for rich multimedia Internet applications, with high browser penetration rates and availability on most major hardware and operating systems. Users can easily run Flash applications from a wide variety of devices, from personal computers to mobile phones and videogame consoles. Increasingly, modern Flash applications are using distributed objects to offer users a shared online context between users and servers. As a result, for example, in virtual communities and online game worlds, users can affect persistent changes on other users. For example, users can talk to each other, trade items, team up into parties, and perform other interactions. Additionally, due to the easy accessibility of the Flash platform, users can access these online communities almost anywhere, whether at home, at the office, in an Internet café, or at an airport terminal.

However, interactivity is restricted to devices that can communicate directly with the Flash application. Thus, human input devices are limited to traditional keyboards, pointing devices such as computer mice, web cameras, and other devices with direct hardware support within Flash. Additionally, output from the Flash application is typically limited to audiovisual content played on the system executing the Flash application. Thus, features like vibration, movement of physical objects, and audiovisual playback on a separate device are difficult to support within a Flash application.

While peripherals directly connectable to Flash may be appropriate for traditional applications, more innovative ways to interact with online games and communities may require new hardware support not implemented in Flash. Although such new hardware may be easily supported by standalone hardware or software, users would prefer a solution with the least amount of technical hassle. Flash applications can be conveniently accessed over the Internet and Flash environments are typically preinstalled or easily obtainable in many systems, allowing users to avoid the hassle of using dedicated gaming hardware or installing additional game software, which may be especially impractical within a public context. A user can therefore access the same online account from home, at the office, or during travel thanks to the easy availability of the Flash platform. However, the Flash platform only provides limited support for direct hardware access, limiting the ways in which users can interact with Flash applications.

Accordingly, there is a need to overcome the drawbacks and deficiencies in the art by providing a way for a user to interact with the widely accessible Flash platform to provide an interactive experience in a shared online environment, breaking through the current limitations of directly addressable hardware within Flash applications.

SUMMARY OF THE INVENTION

There are provided systems and methods for providing an integrated hardware platform for Flash applications with distributed objects, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for an integrated hardware platform with distributed objects for Flash. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present 1.0 application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
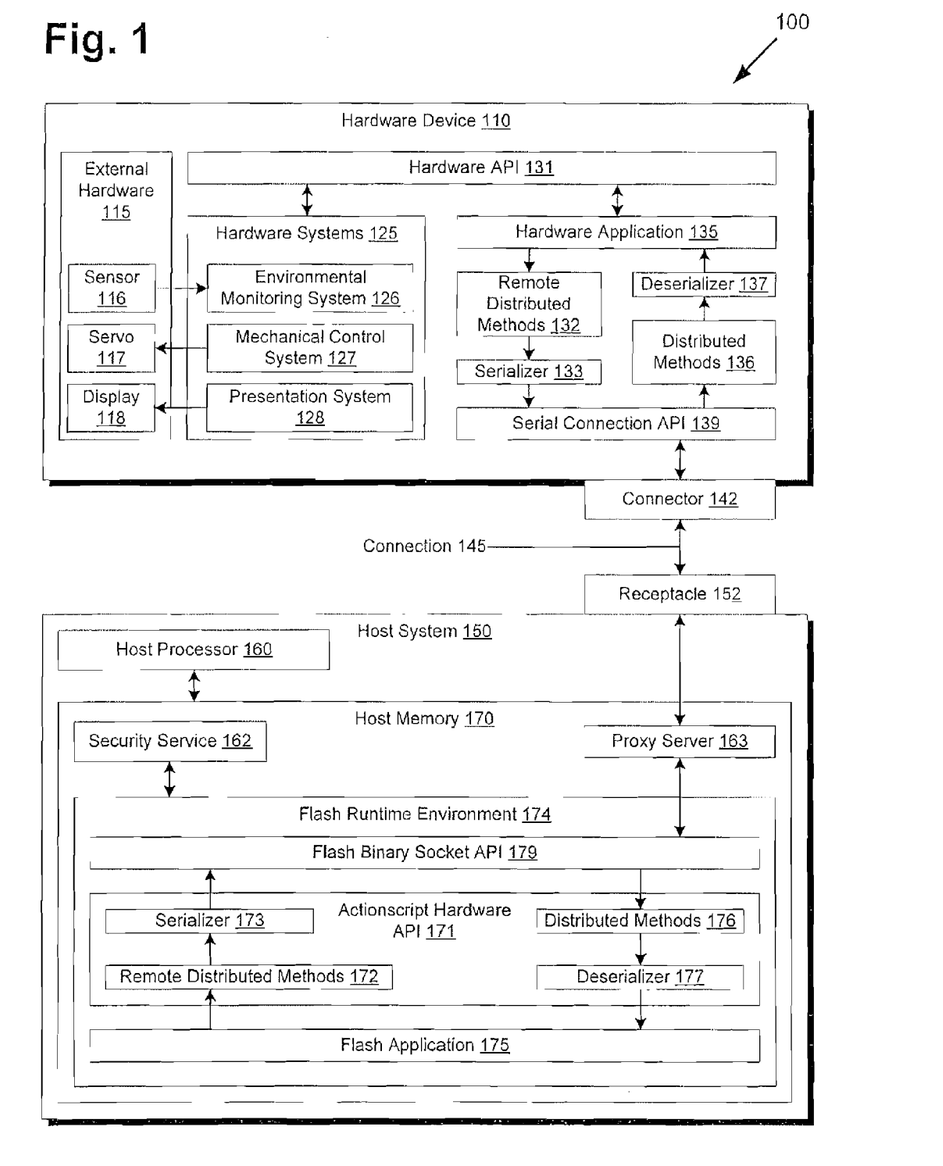
FIG. 1 presents a block diagram of an integrated hardware platform environment, according to one embodiment of the present invention.

FIG. 1 presents a block diagram of an integrated hardware platform environment, according to one embodiment of the present invention. Environment 100 includes hardware device 110 and host system 150. Hardware device 110 includes external hardware 115, hardware systems 125, hardware API 131, remote distributed methods 132, serializer 133, hardware application 135, distributed methods 136, deserializer 137, serial connection API 139, and connector 142. External hardware 115 includes sensor 116, servo 117, and display 118. Hardware systems 125 include environmental monitoring system 126, mechanical control system 127, and presentation system 128. Connection 145 provides data communications between connector 142 of hardware device 110 and receptacle 152 of host system 150. Host system 150 includes receptacle 152, host processor 160, and host memory 170. Host memory 170 includes security service 162, proxy server 163, and Flash runtime environment 174. Flash runtime environment 174 includes Actionscript hardware API 171, Flash application 175, and Flash binary socket API 179. Actionscript hardware API 171 includes serializer 172, remote distributed methods 173, deserializer 176, and distributed methods 177.

From a high level perspective, environment 100 allows host system 150 to interact with connected hardware device 110. Host system 150 runs Flash application 175 via host processor 160, which may further connect to a networked online game supported by a distributed online service of a game server. Besides gaming, Flash application 175 could also support any other type of distributed online application such as virtual worlds, business collaboration, social networking, or electronic commerce.

For simplicity, FIG. 1 depicts only a single host system and omits details regarding the game server, which are discussed with more detail in FIG. 3 below. Furthermore, FIG. 1 depicts only a single hardware device connected to host system 150, but alternative embodiments may allow concurrent access to many hardware devices on a single host system running a Flash application. For example, Flash application 175 might comprise a racing game allowing multiple numbers and types of hardware devices such as steering wheels and pedals to be connected to host system 150, with a split-screen video display to accommodate multiple players. Flash application 175 can then be programmed to detect and utilize all connected steering wheels and pedals, and proxy server 163 can be correspondingly configured to properly route communications between Flash application 175 and multiple hardware devices. This multiple hardware device feature could also be combined with an online game server to provide many-to-many communications between hardware devices and Flash applications, allowing, for example, an online race where multiple participating host systems can each accommodate one or several players, depending on the number of hardware devices connected at each host system. However, to facilitate concise examples and improve readability, the present application will focus on embodiments where only a single hardware device is connected to a host system.

Hardware device 110 may provide novel features to Flash application 175 not otherwise available to a standard Flash platform, such as physical movement, environmental monitoring, a secondary display or speaker, and other hardware capabilities. With this additional hardware, interaction with host system 150 is extended beyond native capabilities of Flash runtime environment 174 and standard supported hardware capabilities of host system 150. By utilizing hardware Application Program Interface (API) 131 implementing RMI (Remote Method Invocation), Flash application 175 can remotely control hardware systems 125 of hardware device 110, or provide data requested from hardware device 110. Similarly in the reverse direction, Actionscript Hardware API 171 allows hardware device 110 to remotely control Flash application 175 or return requested values. Furthermore, a distributed object API, omitted from FIG. 1, may allow Flash application 175 to interface with other remote hardware devices connected to other host systems by communicating with a game server.

Host system 150 might comprise a personal computer, a videogame console, a mobile phone, or any other device capable of running the Flash platform. Host system 150 might have previously accessed a web server via a web browser to download Flash application 175 over a network such as the Internet. Flash application 175 may then execute in Flash runtime environment 174, which might comprise a web browser plug-in providing Flash player support.

Flash runtime environment 174 provides an environment where Flash application 175 can be interpreted into machine code executable by host processor 160. Shockwave Flash (SWF) files do not correspond to machine code that can be directly executed, but are stored in the form of intermediate bytecode needing translation into machine code to run on an intended platform. This may seem disadvantageous at first, but precisely because the SWF file is not tied to a particular architecture by compilation directly into machine code, the same SWF file can be used across disparate platforms by utilizing a Flash runtime environment appropriate for each desired target platform, similar to Java. This allows Flash applications to be run on a wide variety of contexts, platforms, and configurations, but at some processing expense due to the interpretative runtime environment. Techniques such as dynamic and just-in-time (JIT) compilation can mitigate many of the performance penalties of using bytecode rather than precompiled binaries.

For most users, the most familiar Flash runtime environment is a browser plug-in for a web browser, such as Internet Explorer or Firefox, supporting a particular platform or architecture, such as Windows or Linux. This allows Flash applications to be rendered within the context of a web browser. However, the browser plug-in is not the only method of rendering Flash. For example, the Adobe Integrated Runtime or Adobe AIR provides a cross-platform runtime environment supporting Flash but geared towards locally installed desktop applications rather than applications running in a web browser. Thus, the Adobe AIR environment can provide additional features commonly available to locally installed desktop applications such as local and offline data storage. Whether Flash runtime environment 174 is running as a browser plug-in, is locally installed as Adobe AIR, or represents some alternative application paradigm, Flash application 175 can be supported.

Hardware device 110 is linkable to host system 150 via connection 145, which could comprise, for example, a Universal Serial Bus (USB) cable which physically links to connector 142 and receptacle 152. In this embodiment, proxy server 163 may include mechanisms for seamlessly translating between binary socket communications used by Flash binary socket API 179 and USB serial connections used by serial connection API 139.

USB is only one example protocol for hardware device connection and alternative embodiments might use, for example, a Firewire connector, or wireless transmission using a protocol such as Bluetooth or WiFi. If connection 145 comprises a physical cable such as USB or Firewire, then connection 145 can retrieve electrical power from host system 150 to operate components of hardware device 110. In the case of wireless transmission, connector 142 and receptacle 152 might be replaced with wireless receivers and transmitters, connection 145 might represent a wireless radio signal, and power might be supplied via a rechargeable embedded battery with a docking station or some other method. Both wired and wireless connectivity might also be provided, with wired connections recharging the battery. Since proxy server 163 and serial connection API 139 are modularized from Flash application 175 and hardware application 135, new connectivity protocol support can be readily implemented, as the applications do not directly interface with a connectivity protocol.

Once hardware device 110 is provided electrical power, hardware application 135 can manipulate hardware systems 125 via hardware API 131, including environmental monitoring system 126, mechanical control system 127, and presentation system 128. The peripheral hardware systems provided are merely exemplary, as any arbitrary hardware could be added to hardware device 110. Environmental monitoring system 126 might provide various details concerning the external environment, such as tactile interactions, audio feedback, and video feedback, which could be supported by tactile sensors, microphones, and video cameras. Mechanical control system 127 might provide for movement of hardware device 110 by controlling servos, gears, motors, and other mechanical devices. Presentation system 128 might control various audiovisual elements, such as a LCD screen, a speaker, and LED lights, External hardware 115 provides the actual hardware components to support hardware systems 125, including sensor 116 for monitoring, servo 117 for movement, and display 118 for displaying images.

Hardware device 110 also contains remote distributed methods 132 and distributed methods 136, forming the hardware device side of an RMI system. Hardware application 135 can then use hardware API 131 to control hardware systems 125 in accordance with distributed methods 136, or send remote distributed methods 132 to request servicing from Flash application 175. Similarly, Flash application 175 can use Actionscript hardware API 171 to invoke remote distributed methods 172 or receive distributed methods 176, which form the Flash side of the RMI system. Serializer 133 and deserializer 137 perform various object data conversions for hardware device 110 that may be necessary, such as marshalling and unmarshalling, reference resolving, and other operations. A portable data stream results, capable of being semantically identical even at remote locations of differing architectures or environments. For example, the corresponding serializer 173 and deserializer 177 allow host system 150 to seamlessly communicate object data with hardware device 110, even if host system 150 runs on a radically different architecture.

Flash application 175 can achieve more timely and accurate hardware control by using remote methods to drive hardware systems 125 rather than attempting to control hardware systems 125 directly. This is particularly the case where hardware systems 125 need to be driven with strict timing tolerances to operate effectively or at all. For example, servo 117 may be driven by pulse-width modulation expecting pulse signals at a periodic rate of only a few milliseconds. Since embedded processor 120 can dedicate all its resources to servicing solely hardware application 135, if hardware application 135 is properly developed it can support guaranteed timely pulse signal generation.

Flash application 175, however, may execute on a general-purpose multitasking host platform such as Windows, designed to accommodate several different applications concurrently by using a process scheduler to service all executing tasks. Thus, Flash application 175 may need to compete with other tasks for the attention of host processor 160. As such, tasks on hardware device 110 demanding real-time servicing may not receive guaranteed resources, since hardware interrupts or other software processes may preempt host processor 160. Even if enough resources are available on host system 150 to service a time critical task, some latency may be introduced due to protocol overhead sending a command from Flash application 175 to hardware systems 125. During this period of latency, a critical time window for hardware control may have already elapsed.

On the other hand, dedicated off-host computations, such as those provided by an embedded processor, can provide real-time responsiveness for fine-grained hardware control. While developing hardware application 135, methods can be optimized for the capabilities of an embedded processor within hardware device 110 to ensure that hardware systems 125 and the corresponding external hardware 115 are driven effectively within limited CPU cycles provided by the embedded processor. Since an embedded processor does not need to support other applications as a general purpose processor would, method execution times can be measured and optimized within time tolerances required of external hardware 115. Thus, remote methods supported by hardware application 135 can guarantee timeliness for accurate and effective hardware control.

Before Flash application 175 can invoke a remote method to control hardware systems 125, a reference to a distributed object for hardware device 110 must be provided first, which may for example be exchanged at the end of a communications handshake procedure or retrieved by consulting a name directory service. Once the distributed object is retrieved, it exposes or provides an interface of remote methods that can be invoked by Flash application 175, shown in FIG. 1 as remote distributed methods 172. These remote methods might, for example, allow environmental monitoring system 126 to retrieve temperature data via sensor 116, mechanical control system 127 to move an object via servo 117, and presentation system 128 to show an image on display 118.

Thus, developers of Flash application 175 need not concern themselves with the detailed workings of hardware device 110, and can simply invoke remote methods exposed by Actionscript hardware API 171, which are implemented by, for example, machine code at hardware device 110. Similarly, if hardware device 110 needs certain information or tasks to be accomplished from Flash application 175, developers of hardware device 110 can use remote distributed methods 132, rather than having to understand the intricacies of Flash application 175. By using this technique of modular development, workflows can be segmented and developed independently, accelerating release schedules and reining in development costs.

Although FIG. 1 has adopted an object oriented RMI approach for remote execution, procedural Remote Procedure Calls (RPCs) or other methods of providing remote execution can also be utilized. A more flexible RMI approach than illustrated in FIG. 1 might also be implemented, such as an RMI system supporting dynamically loadable classes. Currently, only object references are passed, and API implementations are assumed to exist at remote locations. Dynamically loadable classes would allow the hardware API to be easily updated since API implementations could be retrieved on demand with updated methods.

However, since embedded processor 120 may have constrained computing resources due to cost and power considerations, a complicated RMI system may be undesirable. The methods to be executed on hardware device 110 will generally be well known and immutable since hardware systems 125 will not likely support modular interchanging of hardware systems by end users, so it may make more sense to build an embedded static hardware API for hardware device 110 tailored to the specific hardware systems to be included in manufacturing. However, the static hardware API could also be stored on a rewritable memory portion, allowing the hardware API to still be updated if bug fixes or additional methods are developed for hardware systems 125.

Flash runtime environment 174 can route communications through a network stack of host system 150, such as a Transmission Control Protocol/Internet Protocol (TCP/IP) stack. Since Flash application 175 can only directly address hardware natively supported within Flash runtime environment 174, Flash application 175 can utilize network communications instead to communicate with hardware device 110, as network communications are natively supported within Flash runtime environment 174.

However, since hardware device 110 is connected to host system 150 by USB rather than by network, proxy server 163 provides a routing service translating between Flash application 175 and hardware device 110. Proxy server 163 may be executing as a localhost service, intercepting communications traveling through specified network ports. An initial handshake sequence between hardware device 110 and host system 150 after connection 145 is established may result in security service 162 and proxy server 163 being copied from hardware device 110 to host memory 170 for further execution by host processor 160. Flash binary socket API 179 can then be configured to communicate with localhost over the specified network ports for communications with hardware device 110, with proxy server 163 seamlessly handling conversion between binary socket data and serial data. Thus, proxy server 163 bridges the communications gap between hardware device 110 and Flash application 165 by leveraging natively supported network communications abilities of Flash.

Allowing Flash application 175 to send and receive data from any arbitrary location could pose a potential security issue, particularly for DNS rebinding attacks, so various security protocols have been implemented in newer versions of Flash. Of particular interest are socket policy files, which present a list of rules governing the allowable network ports and hosts for socket connections. Socket policy files can therefore enable servers to deny access from certain hosts or ports, but Flash clients must first be aware of them.

Thus, before Flash runtime environment 174 allows Flash binary socket API 179 to communicate over a requested network port to a server destination, Flash runtime environment 174 automatically issues a request for a socket master policy file to the IP address of the same server destination over a default port 843. This request is sent even if the server destination is on the same domain as the requesting host. Alternatively, Flash binary socket API 179 can explicitly specify an alternative port to request the security policy. If the server destination does not provide a response within a timeout period, or if a returned socket policy file denies access from host system 150 or the requested network port, then Flash runtime environment 174 will deny socket communications with the server destination, and Flash binary socket API 179 may return an error code for the original request.

Security service 162 may satisfy the above security features of Flash by providing an appropriately formatted security policy in the form of a socket policy file allowing access from host system 150 on network ports to be used by proxy server 163. Thus, Flash runtime environment 174 is granted permissions to communicate with the server destination, or host system 150 since localhost is an identity reference, over ports serviced by proxy server 163. These permissions are only a minimum amount of privileges enabling intercommunication between host system 150 and hardware device 110, and security service 162 could, for example, return a more expansive socket policy file allowing access from any host and any port.

While the socket policy file specifies permissions for socket communications, a socket meta-policy specifies permissions to access the socket policy file itself. Socket meta-policies may only be defined within a master socket policy file served from the default port 843. However, since the default meta-policy is to allow access to socket policy files from any port and at any location on the server destination, there is generally no need to specify a meta-policy since the "all" setting is the default. Moreover, the default socket meta-policy is expected to remain "all" for future versions of Flash.

While security service 162 and proxy server 163 allow Flash application 175 to communicate with hardware device 110, they need to be executing by host processor 160 to provide such communication services. While traditional locally installed software can accomplish this fairly trivially by installing a local service or a specialized driver, the situation may be less obvious in the context of a Flash application.

One possibility is to use a handshake procedure upon the establishment of connection 145, which initiates the execution of security service 162 and proxy server 163. This handshake procedure might, for example, rely on presenting hardware device 110 as a generic HID (Human Interface Device), such that host system 150 can automatically support hardware device 110 without specialized drivers, and Flash application 175 can simply poll for the presence of hardware device 110 to initiate the handshake procedure. In this manner, a user can simply connect hardware device 110 for immediate use within Flash application 175, without having to deal with complicated software or driver installation. Other embodiments might use, for example, an automatic execution mechanism such as Autorun for Windows, or downloadable driver plug-ins such as Java or ActiveX widgets. However, due to various security warnings and prompts that a user may have to navigate, an embodiment using a generically recognized interface automatically supported by host system 150 may be preferable, as such interfaces can generally operate without user intervention. Future host platforms may provide trusted computing such that automatic execution of trusted code from legitimate publishers may be permitted, possibly providing a more flexible and elegant system.

For the purposes of this application, it is assumed that a handshake procedure can be implemented to start the execution of security service 162 and proxy server 163 on host processor 160. As a fallback, a manual software installation guide or software download can be provided to end-users if various attempts at automated support for hardware device 110 fail. Once a driver or software is manually installed, it might be configured to automatically execute upon startup of host system 150, mitigating some of the hassle of manual installation as the user needs to complete the procedure only once.

Figure 2A:
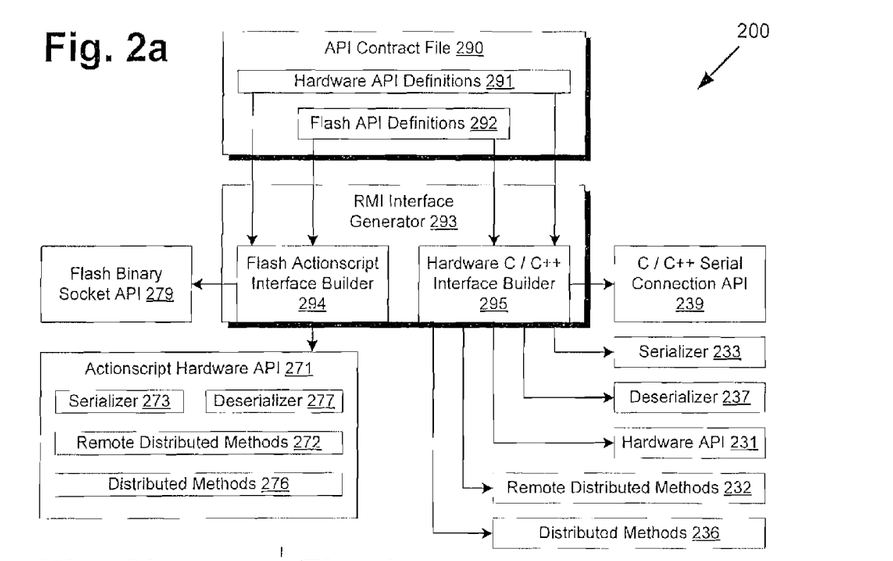
FIG. 2a presents a flowchart depicting interface generation workflows for the integrated hardware platform, according to one embodiment of the present invention.

Moving to FIG. 2a, FIG. 2a presents a flowchart depicting interface generation workflows for the integrated hardware platform, according to one embodiment of the present invention. Flowchart 200 includes API contract file 290, RMI interface generator 293, Flash binary socket API 279, Actionscript hardware API 271, C/C++ serial connection API 239, serializer 233, deserializer 237, hardware API 231, remote distributed methods 232, and distributed methods 236. API contract file 290 includes hardware API definitions 291 and Flash API definitions 292. RMI interface generator 293 includes Flash Actionscript interface builder 294 and hardware C/C++ interface builder 295. Actionscript hardware API 271 includes serializer 273, deserializer 277, remote distributed methods 272, and distributed methods 276.

Actionscript hardware API 271 corresponds to Actionscript hardware API 171 from FIG. 1, including serializer 273 to serializer 173, deserializer 277 to deserializer 177, remote distributed methods 272 to remote distributed methods 172, and distributed methods 276 to distributed methods 176. Flash binary socket API 279 corresponds to Flash binary socket API 179. C/C++ serial connection API 239 corresponds to serial connection API 139. Serializer 233 corresponds to serializer 133. Deserializer 237 corresponds to deserializer 137. Hardware API 231 corresponds to hardware API 131. Remote distributed methods 232 correspond to remote distributed methods 132. Distributed methods 236 correspond to distributed methods 136.

Some of the development benefits from using an RMI approach for remote execution as described in FIG. 1 can be seen in flowchart 200. Before writing implementation code, API contract file 290 may be prepared in advance with agreed standards as to how both Flash remote methods, or Flash API definitions 292, and hardware remote methods, or hardware API definitions 291, will behave. With the results of processing API contract file 290 through RMI interface generator 293 and the development of emulated test systems to substitute for remote work in progress (WIP) API methods, development teams can independently develop Flash Actionscript or hardware C/C++ without waiting for or relying on the progress of other development teams. As long as developers follow a specification predetermined by API contract file 290, then later integration of independently developed code should work seamlessly together without any problems. Moreover, by allowing RMI interface generator 293 to produce API modules handling the details of RMI support and network or serial bus communications, human programming errors that may result from manually coding these API modules may be avoided and developers can focus their attention on implementation code for the main Flash or C/C++ applications.

Increased modularization and abstraction of program code resulting from API contract file 290 also facilitates a higher level programming style that is easier to read, develop, debug, and maintain, reducing development time and costs in the long term. While ad-hoc programming styles with large amounts of embedded low level programming and redundant code may offer quicker initial development times, for any moderately sized project such as an online game, code maintenance may quickly become a liability without logical modularization of code, whereas well defined APIs as provided by API contract file 290 can encourage logical modularization and code reuse.

Examining RMI interface generator 293, both Flash Actionscript interface builder 294 and hardware C/C++ interface builder 295 generate various API modules already observed in FIG. 1. RMI interface generator 293 can take generically described API definitions from API contract file 290, and convert them to API modules described in code for particular target platforms, or Flash and C/C++ in the case of FIG. 2a. RMI interface generator 293 could also be configured to produce for other target platforms as well by substituting interface builders, but C/C++ is a commonly used programming language for low level systems programming and may be well suited for producing the machine code for test hardware device 210. A custom RMI interface generator 293 might be internally developed, or API contract file 290 might be expressed using an existing interface description language and an existing cross platform RMI interface generator 293 might be used to accelerate development.

Figure 2B:
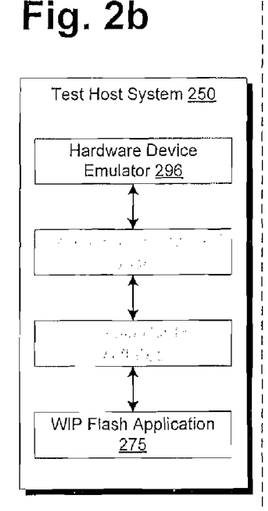
FIG. 2b presents a block diagram of a Flash development environment for the integrated hardware platform to be utilized by Flash developers, according to one embodiment of the present invention.

Turning to FIG. 2b, FIG. 2b presents a block diagram of a Flash development environment for the integrated hardware platform to be utilized by Flash developers, according to one embodiment of the present invention. FIG. 2b includes test host system 250, which includes WIP (Work in Progress) Flash application 275, Actionscript hardware API 271, Flash binary socket API 279, and hardware device emulator 296. Test host system 250 may correspond to a simplified version of host system 150 from FIG. 1.

Flash binary socket API 279 and Actionscript hardware API 271 are shown in gray to emphasize that these API modules have already been generated through RMI interface generator 293 and need no further interaction from developers. Thus, a Flash development team can focus development on WIP Flash application 275, or the online game that WIP Flash application 275 will support on the client side, including the implementation of distributed methods 276.

Since a separate team may be developing the hardware device, hardware device emulator 296 substitutes as a stand-in for development purposes. Hardware device emulator 296 does not necessarily need to accurately emulate the hardware device. For example, hardware device emulator 296 could implement methods to return predetermined testing values, or it may more closely mimic the responses of an actual hardware device, depending on available development resources, product schedules, and progress from other development teams. Work in progress hardware devices might also be used, with undeveloped remote methods directed to hardware device emulator 296a and developed remote methods directed to the WIP hardware.

In a similar vein, separate network and server teams might develop a distributed object portion of the project. Test host system 250a could then be tested for network interoperability even in the absence of a working network infrastructure by using a server emulator for the online game. Conversely, if such a network infrastructure does exist, then test host system 250 could be tested against actual networked hardware. If such tests do occur, then some care may need to be exercised to prevent the general public from trying to access the test components of FIG. 2b. For example, firewalls blocking public access might be installed for the test components, or a local network may be isolated from the public Internet.

Figure 2C:
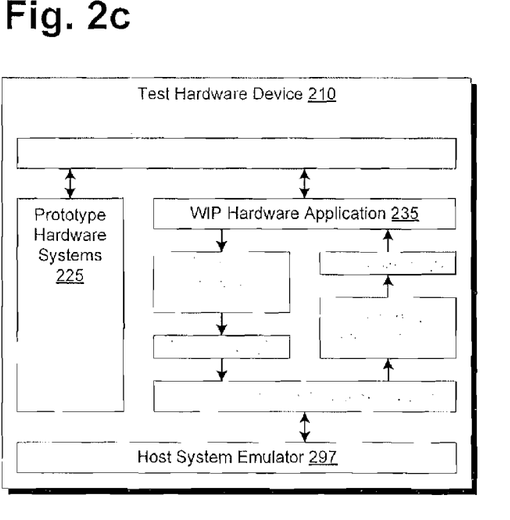
FIG. 2c presents a block diagram of a hardware development environment for the integrated hardware platform to be utilized by hardware developers, according to one embodiment of the present invention.

Moving to FIG. 2c, FIG. 2c presents a block diagram of a hardware development environment to be utilized by hardware device developers, according to one embodiment of the present invention. FIG. 2c includes test hardware device 210, which includes hardware API 231, prototype hardware systems 225, WIP hardware application 235, remote distributed methods 232, serializer 233, distributed methods 236, deserializer 237, C/C++ serial connection API 239, and host system emulator 297. Test hardware device 210 may correspond to a simplified version of hardware device 110 from FIG. 1. Prototype hardware systems 225 may correspond to hardware systems 125.

Similar to FIG. 2b, several API elements are shown in gray to indicate they are already prepared by RMI interface generator 293, including hardware API 231, remote distributed methods 232, serializer 233, distributed methods 236, deserializer 237, and C/C++ serial connection API 239. Thus, a hardware development team can focus development on WIP hardware application 235, or the main hardware control program that interfaces with prototype hardware systems 225, and the implementation of distributed methods 236.

Since a separate Flash development team may be developing the Flash application, host system emulator 297 substitutes as a host system executing the Flash application for development purposes. Similar to hardware device emulator 296 from FIG. 2b, host system emulator 297 does not necessarily need to accurately emulate a host system executing the Flash application. For example, host system emulator 297 could implement methods to return predetermined testing values, or it may more closely mimic the responses of an actual Flash application, depending on available development resources, product schedules, and progress from other development teams. Work in progress Flash applications on test host systems might also be used, with undeveloped remote methods directed to host system emulator 297, and developed remote methods directed to the WIP Flash application.

Similarly, development of prototype hardware systems 225 may be separate from development of software to drive the hardware systems. An integrated circuits and electrical engineering team might independently work on prototype hardware systems 225, while an embedded systems programming team works on software for driving test hardware device 210, both teams having previously agreed to a protocol on how prototype hardware systems 225 will interface with WIP hardware application 235 via hardware API 231.

Thus, by separating logical interfaces, emulating missing or in development components, and utilizing automated pre-processing tools such RMI interface generator 293 of FIG. 2a, independent parallel development can proceed with only a little advance planning, such as the preparation of API contract file 290. By periodically reintegrating independently developed work in progress components and testing for interoperability, any issues that may require interface revision or implementation changes can be addressed early before becoming major problems. Thus, advantages of a modular programming approach can be retained without sacrificing testing benefits of a monolithic approach.

Figure 3:
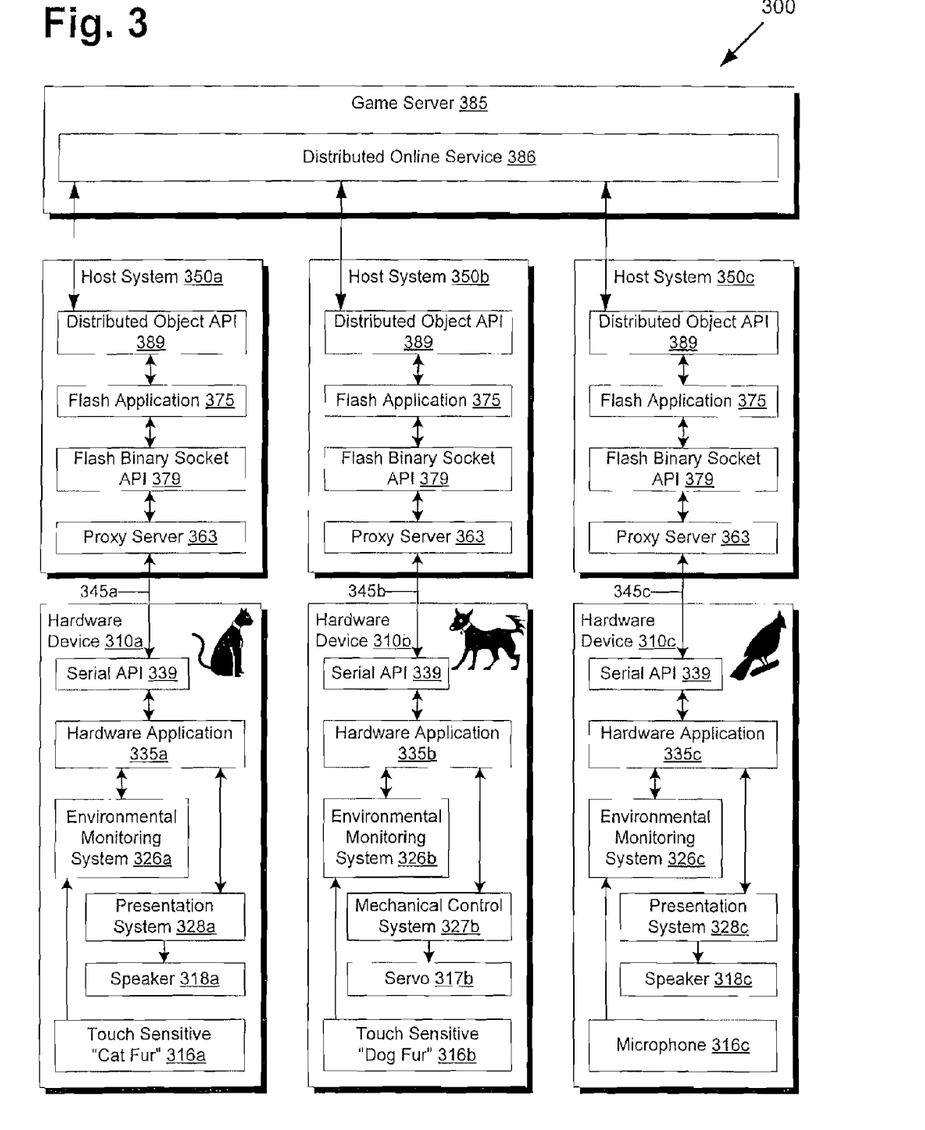
FIG. 3 presents a block diagram of an integrated hardware platform environment with distributed objects, according to one embodiment of the present invention.

FIG. 3 presents a block diagram of an integrated hardware platform environment with distributed objects, according to one embodiment of the present invention. Distributed environment 300 includes hardware device 310a, hardware device 310b, hardware device 310c, host system 350a, host system 350b, host system 350c, and game server 385. Hardware device 310a includes serial API 339, hardware application 335a, environmental monitoring system 326a, presentation system 328a, touch sensitive "cat fur" 316a, and speaker 318a. Hardware device 310b includes serial API 339, hardware application 335b, environmental monitoring system 326b, mechanical control system 327b, touch sensitive "dog fur" 316b, and servo 317b. Hardware device 310c includes serial API 339, hardware application 335c, environmental monitoring system 326c, presentation system 328c, microphone 316c, and speaker 318c. Host system 350a to 350c each include distributed object API 389, Flash application 375, Flash binary socket API 379, and proxy server 363. Connection 345a through 345c connect host system 350a through 350c with hardware device 310a through 310c, respectively.

Although each host system comprises the same application code, an independent host processor for each host system, omitted from FIG. 3, runs a separate execution of the application code. As with FIG. 1, each host client may have already downloaded the application code from a web server. Each hardware device also contains a hardware application specifically customized for a particular hardware configuration of each hardware device, each hardware application executing on an embedded processor omitted from FIG. 3. Several other details are also omitted from FIG. 3, such as some of the details for implementing RMI, to present a more concise and understandable diagram of an example distributed system. FIG. 1 and FIG. 2 may be referenced for additional details if necessary.

Hardware device 310a to 310c each correspond to hardware device 110 from FIG. 1. Serial API 339 corresponds to serial connection API 139. Hardware application 335a to 335c each correspond to hardware application 135. Environmental monitoring system 326a to 326c each correspond to environmental monitoring system 126. Mechanical control system 327b corresponds to mechanical control system 127. Presentation system 328a and presentation system 328c each correspond to presentation system 128. Host system 350a to 350c each correspond to host system 150. Flash application 375 corresponds to Flash application 175. Flash binary socket API 379 corresponds to Flash binary socket API 179. Proxy server 363 corresponds to proxy server 163.

Game server 385 may potentially connect to several host systems to support a shared online environment via distributed online service 386. For example, game server 385 might host an online world where users are represented by animal personae on Flash application 375. The users of each host system might purchase a hardware device representing the animal they wish to play online with. Thus, the user of host system 350a might purchase a cat shaped hardware device as hardware device 310a, whereas the user of host system 350b might purchase a dog shaped hardware device as hardware device 310b, and the user of host system 350c might purchase a bird shaped hardware device as hardware device 310c, shown by the icons in FIG. 3. Each host system can then query their respective hardware devices to retrieve data objects for executing remote methods, and may send those data objects to game server 385 over network 380. Distributed online service 386 can then monitor and manage each connected host system, allowing host systems to access hardware devices connected to other host systems through distributed object API 389.

Although the external appearance of each hardware device may vary, internal components may all resemble hardware device 110 from FIG. 1 with some differing hardware capabilities. Each platform is equipped with an environmental monitoring system, but they are connected to different hardware. For environmental monitoring system 311a, hardware access is given to touch sensitive "cat fur" 316a. This might comprise an artificial coat of cat fur configured to detect petting and other touch interactions. Thus, a user of host system 350a might pet the touch sensitive "cat fur" 316a, which generates hardware signals to be sent to environmental monitoring system 311a, to be passed in turn to hardware application 335a for further processing if necessary. In a similar fashion, touch sensitive "dog fur" 316b might provide the same functionality, and microphone 316c might instead record the spoken voice of a user at host system 350c rather than detecting tactile interaction.

Each hardware device also contains some hardware systems to allow the animal to "react" to interactions. Presentation system 328a providing access to speaker 318a could simulate a cat meowing, for instance. This might be triggered as a response to touch sensitive "cat fur" 316a being petted. Mechanical control system 327b controlling servo 317b could initiate a wagging of an artificial dog tail, also triggered in response to a petting of touch sensitive "dog fur" 316b. Presentation system 328c might retrieve a pitched up voice sample from microphone 316c to imitate the spoken words of a user at host system 350c.

These kinds of interactive toys might be already available on toy store shelves, but Flash application 375 and game server 385 provide a convenient shared online context to use them. For example, once a user connects a hardware device to their respective host system, Flash application 375 might detect the animal type and visually render the animal avatar on a display connected to the host system. Moreover, when Flash application 375 interfaces with distributed object API 389, the user can see not only their own avatar, but also the avatars of other host systems connected to game server 385 via network 380. Thus, each user of each host system in FIG. 3 can all see a cat, a dog, and a bird simultaneously on their respective displays.

By leveraging distributed object API 389, Flash application 375 can support distributed user interactions with animal avatars and associated hardware devices. For example, a user at host system 350b might direct his dog avatar to bark at the cat avatar associated with host system 350a. Flash application 375 may therefore invoke a remote "bark" method provided by hardware device 310b. Hardware application 335b can then execute the associated local method indicated by the invoked object, or the "bark" method. This might, for example, send a command to mechanical control system 327b causing servo 317b to move the external "jaws" of hardware device 310b. A presentation system for hardware device 310b, not shown in FIG. 3, might also be harnessed to create an audible bark through a speaker.

So far, all the effects of the present example have been limited to a local context, or a single host system and a single hardware device. However, recall that the user of hardware device 310b directed the bark towards the cat avatar, or the user associated with host system 350a. Thus, host system 350b might notify game server 385 of this bark action via distributed object API 389 to distributed online service 386. Distributed online service 386 can consult a user accounts database to determine the host system associated with the cat avatar. Distributed online service 386 can then execute some logic to determine what the cat avatar reaction should be, based on chance, account statistics, or other variables, and send an appropriate response to host system 350a. For example, distributed online service 386 method might direct host system 350a to invoke a "fur standing" method, causing touch sensitive "Cat Fur" 316a to stand on end.

Alternatively, the cat might hiss at the dog, causing a similar process to occur. Distributed online service 386 might query a "courage" variable associated with host system 350b to decide the dog's reaction. If the dog has low courage, Flash application 375 might direct mechanical control system 327b to move the dog in a whimpering position using servo 317b, whereas high courage might cause the dog to stand up in a threatening pose. That response can also be sent back to game server 385 so that users at host system 350a and host system 350c can also observe the dog whimpering or threatening the cat on their respective displays. To give another example, phrases that the bird of hardware device 310c repeats over speaker 318c might also be squawked over the speakers of host system 350a and host system 350b, depending on the proximity of the bird avatar to other users within the online world.

This online animal avatar game is only one possible embodiment, and many other embodiments can use the same principles. For example, Flash application 375 might comprise an online racing game with a hardware device that might look like a steering wheel and support force feedback or vibration. If a rival player bumps his car into a user, the user's steering wheel might be instructed to vibrate strongly, and the same effect may happen to the rival player. Flash application 375 could also comprise a two-player networked game of chess with a hardware device resembling a chessboard having hardware to detect the position of chess pieces and move chess pieces without manual intervention. Thus, a user at one side could manually move a chess piece, whereas the chess piece on the other side might move automatically without user intervention, and the display of the virtual chessboard may be updated on both sides.

Of course, the integrated hardware platform might also support other applications besides games. For example, the platform might utilize a drawing tablet for hardware devices, allowing collaborative drawing or idea brainstorming between users connected by the Internet through Flash application 375. Sketches drawn by one user can be seen by other connected users, and other connected users can modify the sketches they see on their tablet, with all users seeing the same shared canvas. Since the integrated hardware platform described in this application provides a generalized, abstract interface to any kind of hardware, the creative possibilities for extending the capabilities of Flash applications are virtually unlimited.

Figure 4:
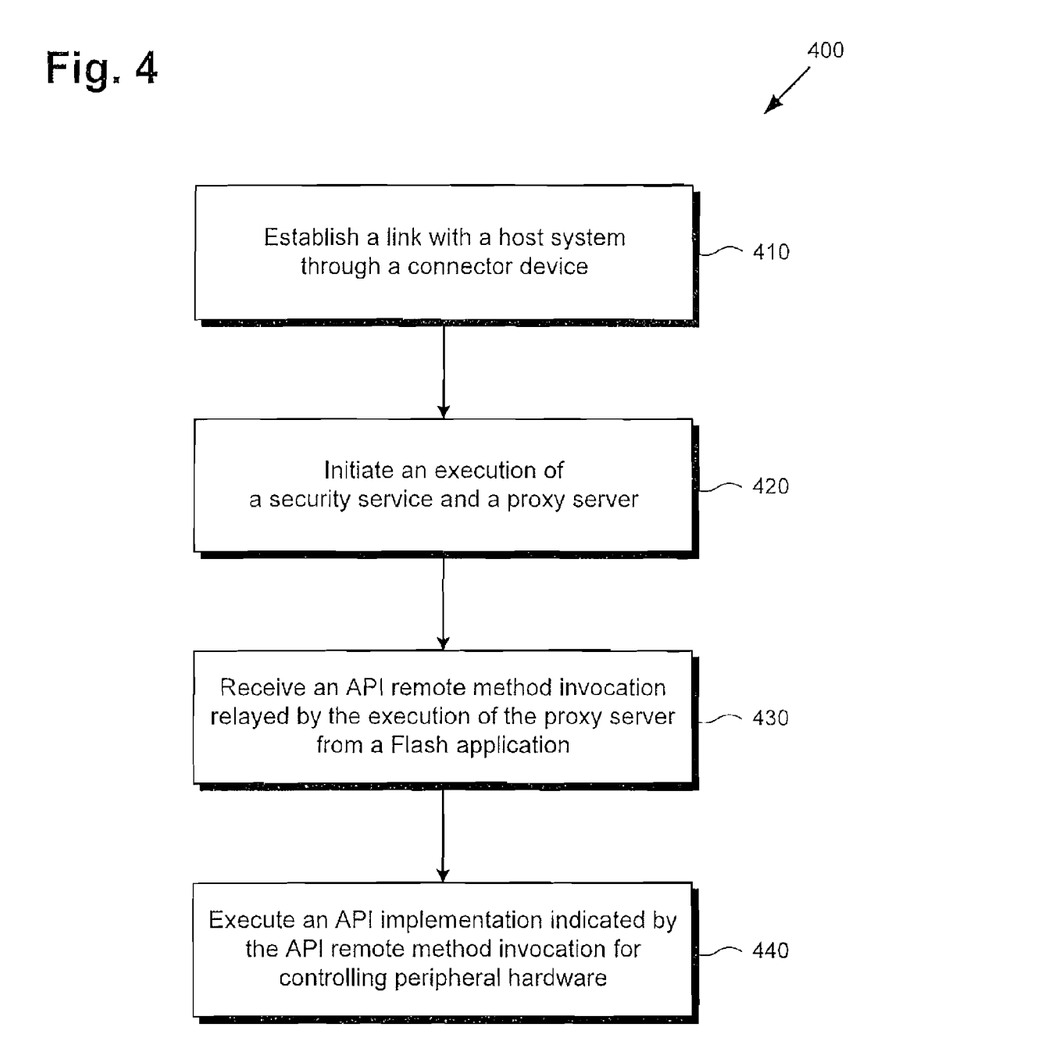
FIG. 4 shows a flowchart describing the steps, according to one embodiment of the present invention, by which a processor of a hardware device in an integrated hardware platform provides hardware control via an Application Program Interface (API) for a Flash application.

FIG. 4 shows a flowchart describing the steps, according to one embodiment of the present invention, by which a processor of a hardware device in an integrated hardware platform provides hardware control via an Application Program Interface (API) for a Flash application. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises a processor of hardware device 110 establishing a link with host system 150a through connection 145. As previously discussed, this might be done with a physical connection such as a USB cable, or by wireless transmission with a battery as a power source. Alternatively, both connection types may be supported, with a physical connection providing charging power for the battery. If connector 145 is a physical connection, then embedded processor 120 may be idle until it receives current from connector 142 indicating an electrical connection. If connection 145 uses wireless transmission, then a manual switch or a wireless receiver dongle inserted into host system 150a might trigger embedded processor 120 into an operating state. Once hardware device 110 receives power, it might begin to prepare any necessary handshaking or protocol procedures to open communication with host system 150a, such as exposing a detectable USB device.

Referring to step 420 of flowchart 400 in FIG. 4 and environment 100 of FIG. 1, step 420 of flowchart 400 comprises a processor of hardware device 110 initiating an execution of security service code 162 and proxy server code 161 As previously discussed, this might be accomplished by having host system 150 use USB HID discovery and device polling on the Flash side, by leveraging automatic operating system features, by using downloaded plug-ins, or by other methods to copy security service code 162 and proxy server code 163 to host memory 170 for execution by host processor 160 of host system 150. Future platforms may provide trusted computing such that automatic execution of trusted code from legitimate publishers is permitted, providing an elegant solution.

Referring to step 430 of flowchart 400 in FIG. 4 and environment 100 of FIG. 1, step 430 of flowchart 400 comprises embedded processor 120 receiving an API remote method invocation relayed by the execution of proxy server 163 from Flash application 175. The details of this transaction have been discussed in some detail with FIG. 1, but briefly, remote distributed methods 172 is invoked, serialized by serializer 173, forwarded and converted to serial data by proxy server 163, received on hardware device 110 by serial connection API 139, deserialized by deserializer 137, and acted upon by hardware application 135.

Referring to step 440 of flowchart 400 in FIG. 4 and environment 100 of FIG. 1, step 440 of flowchart 400 comprises a processor of hardware device 110 implementing hardware API 131 as indicated by the API RMI from step 430 to control hardware systems 125. Again, the details of this transaction have been discussed in some detail with FIG. 1 and FIG. 2, but to summarize step 440 focuses on the implementation of the particular invoked remote method, which may involve the execution of embedded machine code or by other means.

Additionally, host system 150 can leverage a networked server such as game server 385 of FIG. 3, allowing interactions with hardware devices of other host systems. In this manner, state changes to one hardware device can affect the state of a different hardware device. In a networked context such as FIG. 3, hardware device 310a to 310c can communicate with each other through their respective host systems 350a to 350c by using the common Flash application 375, distributed object API 389, and game server 385. This opens up a new world of interactivity with control over hardware devices previously unsupported directly in the Flash platform. By using a convenient all-in-one integrated hardware platform leveraging the network communications ability of Flash, gaining new hardware support in Flash applications supporting shared online experiences may be as simple as plugging in a USB cord.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A host system for controlling a hardware device, the host system comprising:
a memory storing a multimedia application and a proxy server;
a processor configured to:
establish a link between the host system and the hardware device;
execute the multimedia application and the proxy server;
obtain a first API remote scheme invocation in response to executing the proxy server and the multimedia application;
provide an API implementation indicated by the first API remote scheme invocation for controlling the hardware device; and
send the first API remote scheme invocation to a server for distribution by the server to a second API remote scheme invocation to a second host system.

2. The host system of claim 1, further comprising an API contract file having hardware API definitions and multimedia application API definitions.

3. The host system of claim 1, wherein the second API remote scheme invocation is for use by a second multimedia application executing on the second host system to control a second hardware device linked to the second host system.

4. The host system of claim 1, wherein the hardware device is configured to use a mechanical control system to provide control for physical motion of the hardware device.

5. The host system of claim 1, wherein the hardware device is configured to use a presentation system to control audiovisual elements.

6. The host system of claim 1, wherein the hardware device is configured to use an environmental monitoring system to detect and record external signals to interact with the host system.

7. The host system of claim 6, wherein the environmental monitoring system includes tactile sensors for detecting and recording tactile interactions with the host system.

8. The host system of claim 6, wherein the environmental monitoring system includes a microphone for audio recording and/or a video camera for video recording.

9. A method for use by a host system having a memory and a processor to control a hardware device, the method comprising:
establishing a link, using the processor of the host system, between the host system and the hardware device;
executing, using the processor of the host system, a multimedia application and a proxy server stored in the memory of the host system;
obtaining, using the processor of the host system, a first API remote scheme invocation in response to the executing of the proxy server and the multimedia application;
providing, using the processor of the host system, an API implementation indicated by the first API remote scheme invocation for controlling the hardware device; and
sending, using the processor of the host system, the first API remote scheme invocation to a server for distribution by the server to a second API remote scheme invocation to a second host system.

10. The method of claim 9, wherein the second API remote scheme invocation is for use by another multimedia application executing on the second host system to control a second hardware device linked to the second host system.

11. The method of claim 9, wherein the hardware device is configured to use a mechanical control system to provide control for physical motion of the hardware device.

12. The method of claim 9, wherein the hardware device is configured to use a presentation system to control audiovisual elements.

13. The method of claim 9, wherein the hardware device is configured to use an environmental monitoring system to detect and record external signals to interact with the host system.

14. A peripheral hardware for control via an Application Program Interface (API) of a multimedia application executing in a multimedia runtime environment on a host system, the peripheral hardware comprising:
a connector device linkable to the host system;
a processor configured to:
establish a link with the host system through the connector device;
initiate an execution of a security service and a proxy server on the host system;
receive an API remote method invocation relayed by the execution of the proxy server from the multimedia application; and
execute the API implementation indicated by the API remote method invocation for controlling the peripheral hardware via a hardware API of the peripheral hardware.

15. The peripheral hardware of claim 14, wherein the connector device uses serial bus.

16. The peripheral hardware of claim 14, wherein the peripheral hardware is configured to use a mechanical control system for providing a physical motion.

17. The peripheral hardware of claim 14, wherein the peripheral hardware is configured to use a presentation system for providing an audiovisual feedback.

18. A method for controlling a peripheral hardware via an Application Program Interface (API) of a multimedia application executing in a multimedia runtime environment on a host system, the method comprising:

establishing, using a processor of the peripheral device, a link between a connector device of the peripheral device and the host system;

initiating, using the processor of the peripheral device, an execution of a security service and a proxy server on the host system;

receiving, using the processor of the peripheral device, an API remote method invocation relayed by the execution of the proxy server from the multimedia application; and     executing, using the processor of the peripheral device, the API implementation indicated by the API remote method invocation for controlling the peripheral hardware via a hardware API of the peripheral hardware.

19. The method of claim 18, wherein the connector device uses serial bus.

20. The method of claim 18, wherein the peripheral hardware is configured to use a mechanical control system for providing a physical motion.

* * * * *